(12) United States Patent
Chiang et al.

(10) Patent No.: US 7,647,416 B2
(45) Date of Patent: Jan. 12, 2010

(54) FULL HARDWARE BASED TCP/IP TRAFFIC OFFLOAD ENGINE(TOE) DEVICE AND THE METHOD THEREOF

(75) Inventors: Hsin-Chieh Chiang, Hsinchu (TW);
Yuan-Pang Dai, Hsinchu (TW);
Chuei-Yu Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 862 days.

(21) Appl. No.: 10/882,247

(22) Filed: Jul. 2, 2004

(65) Prior Publication Data
US 2005/0195833 A1    Sep. 8, 2005

(30) Foreign Application Priority Data
Mar. 2, 2004    (TW) .............................. 93105441 A

(51) Int. Cl.
*G06F 15/16*    (2006.01)
*H04J 3/22*    (2006.01)
(52) U.S. Cl. .................. 709/230; 709/250; 370/469
(58) Field of Classification Search .................. None
See application file for complete search history.

(56) References Cited

U.S. PATENT DOCUMENTS

| | | | |
|---|---|---|---|
| 6,483,840 B1 | 11/2002 | Vogel | |
| 6,591,302 B2 | 7/2003 | Boucher et al. | |
| 7,234,053 B1* | 6/2007 | Mahmoud | 713/2 |
| 2001/0053148 A1 | 12/2001 | Billic et al. | |
| 2002/0087732 A1 | 7/2002 | Boucher et al. | |
| 2002/0095519 A1* | 7/2002 | Philbrick et al. | 709/250 |
| 2002/0107971 A1 | 8/2002 | Bailey et al. | |
| 2002/0156927 A1 | 10/2002 | Boucher et al. | |
| 2003/0115337 A1 | 6/2003 | Jayam et al. | |
| 2003/0115338 A1 | 6/2003 | Jayam et al. | |
| 2004/0037319 A1* | 2/2004 | Pandya | 370/469 |
| 2004/0042464 A1* | 3/2004 | Elzur et al. | 370/395.52 |
| 2005/0086349 A1* | 4/2005 | Subramaniyan | 709/230 |
| 2005/0114536 A1* | 5/2005 | Narad | 709/231 |
| 2005/0147126 A1* | 7/2005 | Qiu et al. | 370/474 |
| 2005/0165985 A1* | 7/2005 | Vangal et al. | 710/107 |

* cited by examiner

*Primary Examiner*—Ario Etienne
*Assistant Examiner*—Ho Shiu
(74) *Attorney, Agent, or Firm*—Harness, Dickey & Pierce, P.L.C.

(57) ABSTRACT

A full hardware based TCP/IP traffic offload engine (TOE) device and the method thereof are disclosed. The device includes a TOE interface and a TOE driver. With the designed socket API executing in the kernel of the operating system, the TOE interface and the TOE driver can effectively improve the input/output traffic load between network nodes without protocol stacking.

10 Claims, 5 Drawing Sheets

FULL HARDWARE BASED TCP/IP TRAFFIC OFFLOAD ENGINE(TOE) DEVICE AND THE METHOD THEREOF

BACKGROUND OF THE INVENTION

1. Field of Invention

The invention relates to a data packet processing device and the method thereof. In particular, the invention relates to a device and a method that use a hardware based TCP/IP traffic offload engine (TOE) device to improve the input/output traffic load between network nodes.

2. Related Art

With the rapid development of networks, the most commonly seen communication speed between network nodes has increased from 10 Mbps/100 Mbps in early days to 1 Gbps nowadays. One naturally expects that it will go up to 10 Gbps in the near future. However, as the transmission speed between network nodes increases continuously, the processing speed at the nodes do not have an increase in proportion. Therefore, each network node has to upgrade its hardware equipment or increase the number of hardware devices (through a multiple processor system or a clustered system) in order to satisfy the speed requirement.

The very reason for the above-mentioned problem is actually the cornerstone toward the popularization of the network, namely, the TCP/IP protocol. TCP/IP is the primary protocol in current network systems. Traditionally, one uses software to process packet input/output (IO) load according to the TCP/IP protocol installed in the operating system (OS) kernel. However, in order to provide a flexible module design and to achieve reliability transmissions, the TCP/IP protocol contains a very complicated stack design. Therefore, a lot of computing resources have to be spent on processing network packet 10 in order to executing an additional huge and highly complicated protocol stacking procedure. The result is that the whole network packet processing efficiency is extremely low. Therefore, the network node processing mechanism implemented by software cannot satisfy the increasing network transmission speed.

Among the disclosed prior art, the U.S. Patent Application Nos. 20020107971 and 20020087732, and the U.S. Pat. No. 6,591,302 all use an additional processor along with built-in routines to provide traffic offload. In particular, the U.S. Patent Application Nos. 20020107971 discloses a processor mechanism that processes individual transmission requests and receives packets. The U.S. Patent Application Nos. 20020087732 and the U.S. Pat. No. 6,591,302 further describe the implementation of two additional processors and a peripheral auxiliary circuit design. Although such solutions have the advantage of being more flexible so that it can be rapidly developed and mended if there is any problem, it costs a lot in the implementation and the transmission latency is longer. Therefore, it is not suitable for such applications as terminal interfaces and real-time audio/video presentations.

On the other hand, the U.S. Pat. No. 6,483,840 addresses the problem of how to use a full hardware structure to solve the traffic offload problem. This patent is based upon the OSI network structure. It uses two built-in hardware processing units to process the Layer 3 and Layer 4, achieving the goal of helping with traffic offloads. In comparison with the hardware-along-with-software solution, this structure has a better performance in processing latency. Nonetheless, it is still based upon the most primitive OSI network structure. It keeps the stacking concept in the hardware module design. Thus, the traffic offload solution cannot be optimized.

Consequently, it is imperative to provide a solution that can simultaneously process the traffic offload and solve the transmission latency problem. It does not only break the limitation of existing network structures, but really achieves efficiency optimization.

SUMMARY OF THE INVENTION

In view of the foregoing, the invention provides an efficiency-optimized hardware-based TCP/IP traffic offload engine (TOE) device and the method thereof. Through the completely hardware implementation, the invention can effectively solve the transmission processing latency problem. It achieves the primary goal of traffic offload using a hardware module design without protocol stacking.

Aside from the hardware module design with the no protocol stacking concept (for the optimized integration of Layer 3 and Layer 4 in the network), the technical means of the invention further include modifications in existing functional modules of the operating system (OS) and the use of auxiliary memory. The invention thus achieves the goal of optimizing the traffic offload. Not only is the invention better than the prior art, it is also cheaper. Moreover, it can be applied to different fields, satisfying the increasingly fast network transmission requirement.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

This specification discloses a hardware TCP/IP traffic offload engine (TOE) device and the method thereof. The TOE device contains two main parts: the TOE interface 30 and the TOE driver 300.

Figure 1:
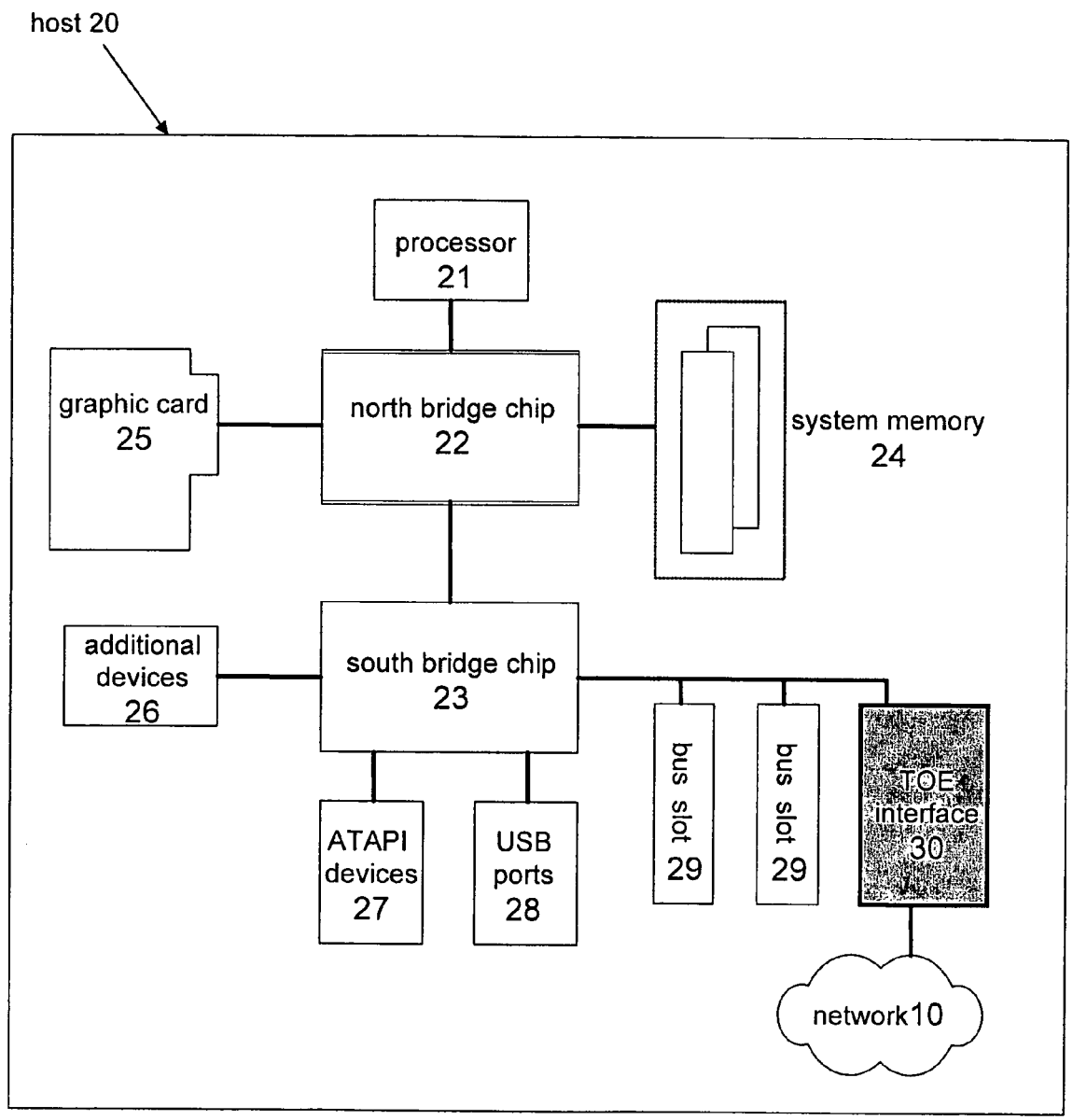
FIG. 1 is a schematic view of the structure of the disclosed device.

The TOE interface 30 is installed on the bus slot 29 in the host 20 (i.e. a network node) for connections with an external network 10, as shown in FIG. 1. The host 20 is a computer executable platform, which is normally a personal computer (PC) including a processor 21, a north bridge chip 22, a south bridge chip 23, system memory 24, a graphic card 25, additional devices 26, ATAPI devices 27, USB ports 28, and bus slots 29. The bus slot 29 installed with the disclosed TOE interface 30 generally refers to the most popular 32-bit 33 MHz PCI local bus. However, the bandwidth of the PCI local bus in principle is 133 MB/sec, not enough to satisfy the transmission requirement between network nodes. Therefore, one can adopt faster buses with other specifications, such as the 64-bit MHz PCI local bus and the PCI-Express. Of course, the system bus transmission inside the host has to be able to provide transmission efficiency with a sufficient bandwidth in order to achieve optimization. Nonetheless, the above-mentioned technical contents are not the essence of the invention. We therefore do not describe in further detail herein.

The technical features of the invention are the TOE interface 30 and the TOE driver 300. We refer to FIGS. 2 and 3 in the following description.

Figure 2:
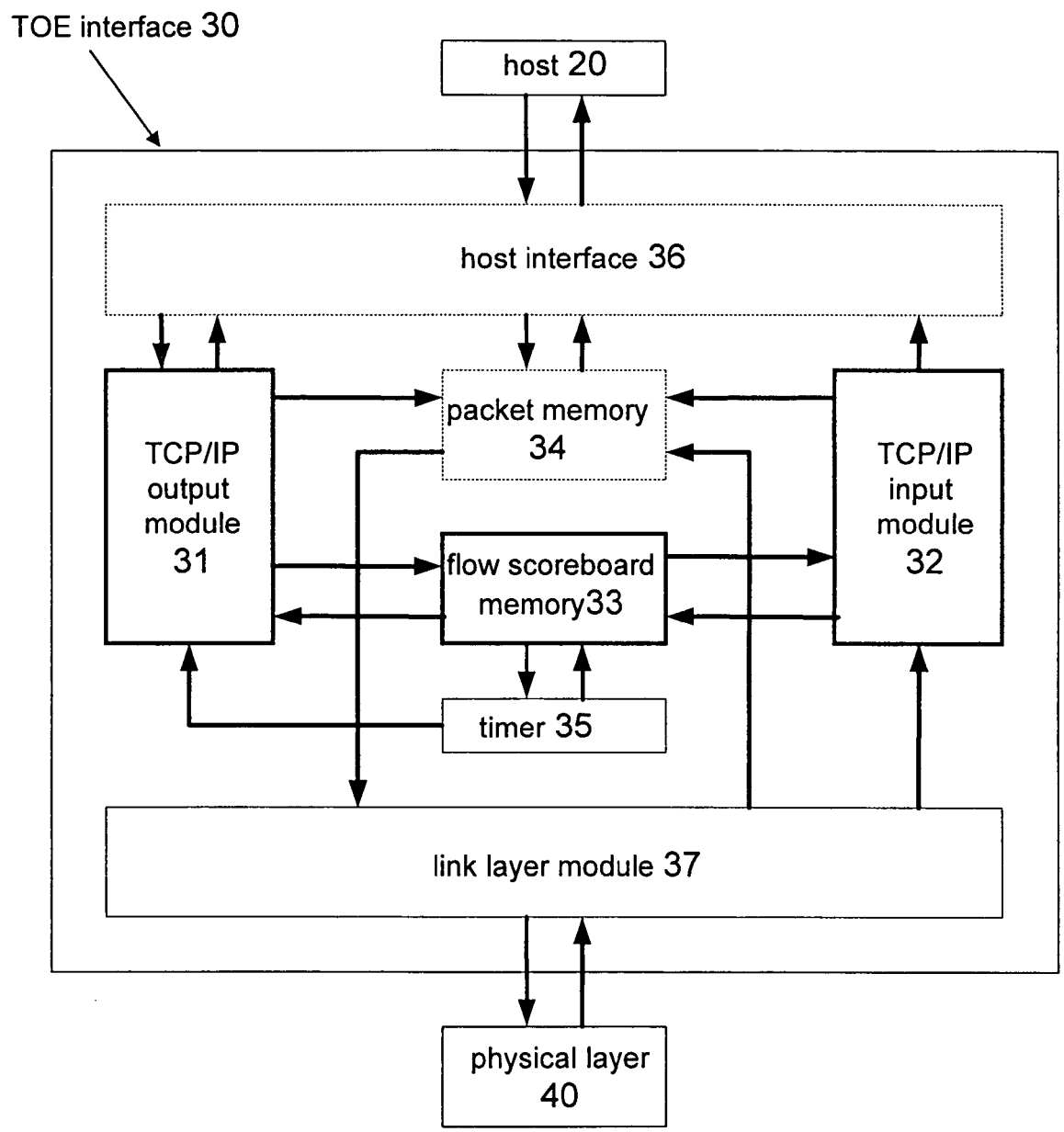
FIG. 2 is a block diagram of the disclosed TOE interface.

(1) The TOE interface 30, as shown in FIG. 2, has the following necessary components:

(1-1) A TCP/IP output module 31 generates complete network transmission packets according to the transmission request sent by a utility in the host 20. At the same time, it connects to the flow scoreboard memory 33 to modify and update the corresponding online connection information, ensuring the normal connection state.

(1-2) A TCP/IP input module 32 receives network packets from an external network 10 (or called the physical layer 40) for analysis and classification. It also connects to the flow scoreboard memory 33 at the same time of receiving network packets. The purposes are to modify and update the corresponding online connection information, ensuring the normal connection state.

In fact, the TCP/IP input module 32 sometimes also requests the TCP/IP output module 31 to generate and transmit network packets to the physical layer 40 in order to maintain the normal operation of the network connection.

(1-3) A flow scoreboard memory 33 is used to record the online connection information related to the network packets transmitted/received by the TOE interface 30. The flow scoreboard memory 33 is in simultaneously communications with the TCP/IP output module 31 and the TCP/IP input module 32. Therefore, it can function as a place for information exchanges and maintaining data consistency during the operating procedure of the whole TOE interface 30.

Aside from the above three necessary components, the TOE interface 30 still contains the following other parts:

(A) A packet memory 34 is used to temporarily hold the network packets transmitted from the TCP/IP output module 31 and analyzed and classified by the TCP/IP input module 32. This can increase the operation efficiency of the entire TOE interface 30.

Generally speaking, the packet memory 34 is the auxiliary memory built inside the TOE interface 30 for temporarily store network packet data to be transmitted/processed. The packet memory 34 further contains an arbitrator to determine the control right of the packet memory 34.

Moreover, the network packets can be read from the packet memory 34 when the host interface 36 or the link layer module 37 require. In addition, as a result of the design of the packet memory 34, the invention can be implemented without additional external memory (in contrast to the prior art), achieving the goal of traffic offload.

(B) A timer 35 connects to the flow scoreboard memory 33 to execute network packet transmission/reception according to the TCP protocol state of each connection.

In fact, the timer 35 drives the TCP/IP output module 31 to generate network packets according to the request of the TCP/IP input module 32 and sends them to the physical layer 40, maintaining the normal operation of the network connection.

(C) A host interface 36 is responsible for the connection between the host 20 and the internal packet memory 34, the TCP/IP output module 31, and the TCP/IP input module 32.

Its main operations include: reading the network packets in the packet memory 34 and sending them to the host 20 or the TCP/IP output module 31; writing the network packets received from the host 20 or the TCP/IP input module 32 into the packet memory 34; executing the data transmission procedure interrupt procedure of the direct memory access (DMA) to the host 20.

(D) A link layer module 37 takes care of the connection with an external network 10 (or the physical layer 40) for processing network data packet transmissions.

Its main operation contents include: transmitting the network data packets read from the packet memory 34; and writing the network packets received from the external physical layer 40 to the packet memory 34 and sending them to the TCP/IP input module 32.

Figure 3:
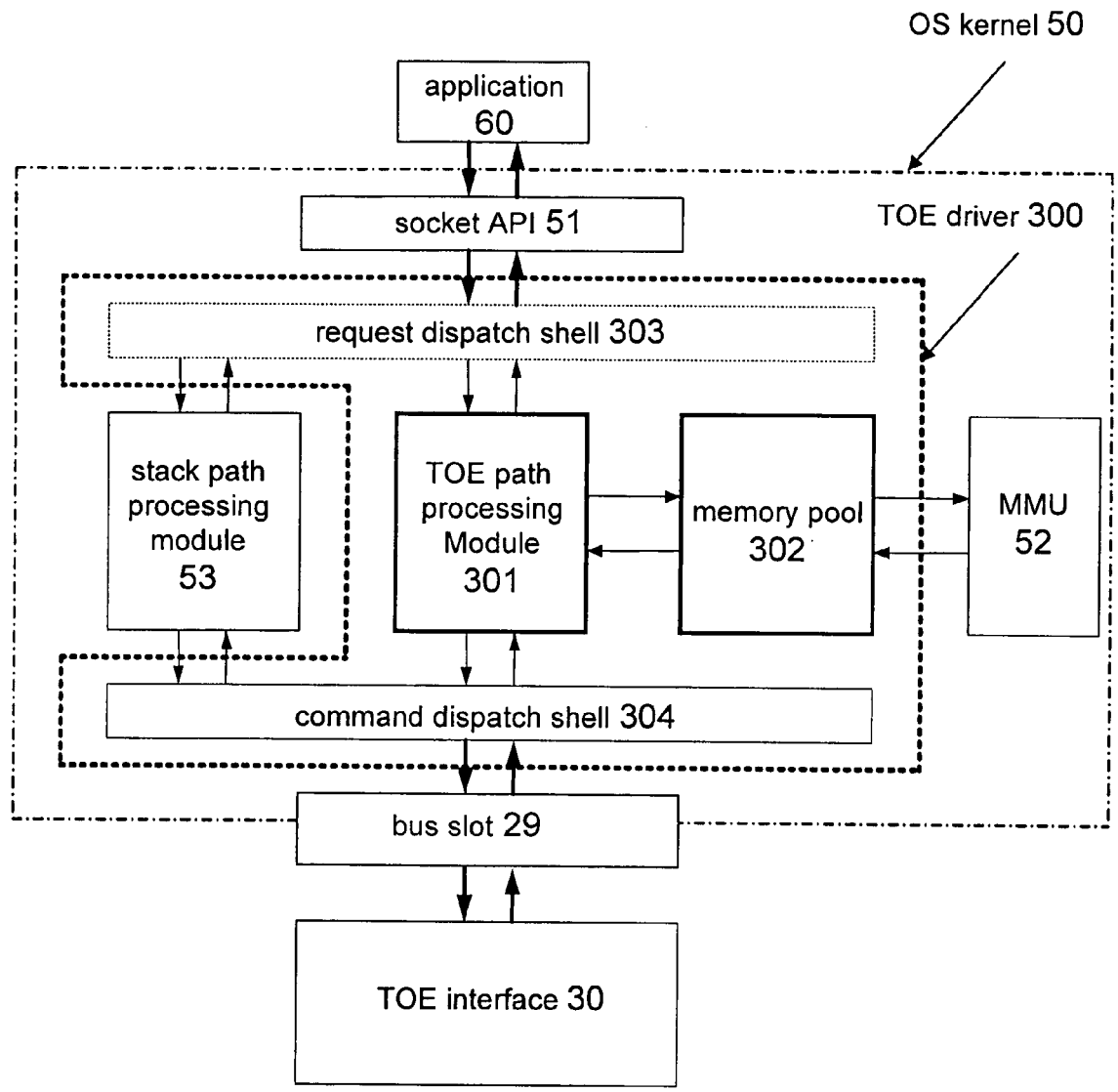
FIG. 3 is a block diagram of the disclosed TOE driver.

(2) For the TOE driver 300, please refer to FIG. 3. It executes operations in the TOE interface 30 under the OS kernel of the host 20. It contains the following necessary components:

(2-1) A TOE path processing module 301 is used to process transmissions and reception of network packets.

When a transmission request is received, the module performs the transmission request conversion and generates the corresponding TOE interface information. On the other hand, when the data transmitted from the TOE interface 30 are received, the module processes the reception. In addition, at the same time of processing transmission/reception, the module further updates the pointer buffer block in the memory pool 302.

(2-2) A memory pool 302 is connected with the TOE path processing module 301 for recording the state of the memory block pointer used by the TOE interface 30.

In addition to the above two necessary components, the TOE driver 300 also includes the following parts:

(A) A request dispatch shell 303 is used to dispatch transmission requests from the utilities in the host 20 to the corresponding processing path.

The rules of determining the processing paths are in accord with the transmission request types asked by the utilities. When a transmission request can be processed by the TOE interface 30, it is processed by the TOE path processing module 301 of the TOE driver 300. Otherwise, when the transmission request has to be processed by stacking, it is handled by another stack path processing module 53 (which is well-known in the prior art).

(B) A TOE command dispatch shell 304 is connected with the TOE interface 30. The communication is achieved through the TOE interface information in the network packets.

To maintain the compatibility and flexibility when transmission network packets between the invention and conventional utilities, the TOE driver 300 further contains a socket application program interface (API) in order to have thorough communications with the utilities. To process some transmission requests that have to be performed using a conventional network stacking method, the disclosed TOE driver 300 also provides a stack path processing module 53, which processes packets under the conventional network protocol using software. Therefore, the invention can operate without problems even when encountering special requests. To facilitate memory management, the TOE driver 300 further contains a memory management unit (MMU) 52 linked with the pointer buffer block 302. It is used to communicate with the MMU 52 in the OS kernel 50, processing the mapping problem between the virtual memory and physical memory. The MMU 52 has different interfaces for different OS's running on the host.

Figure 4:
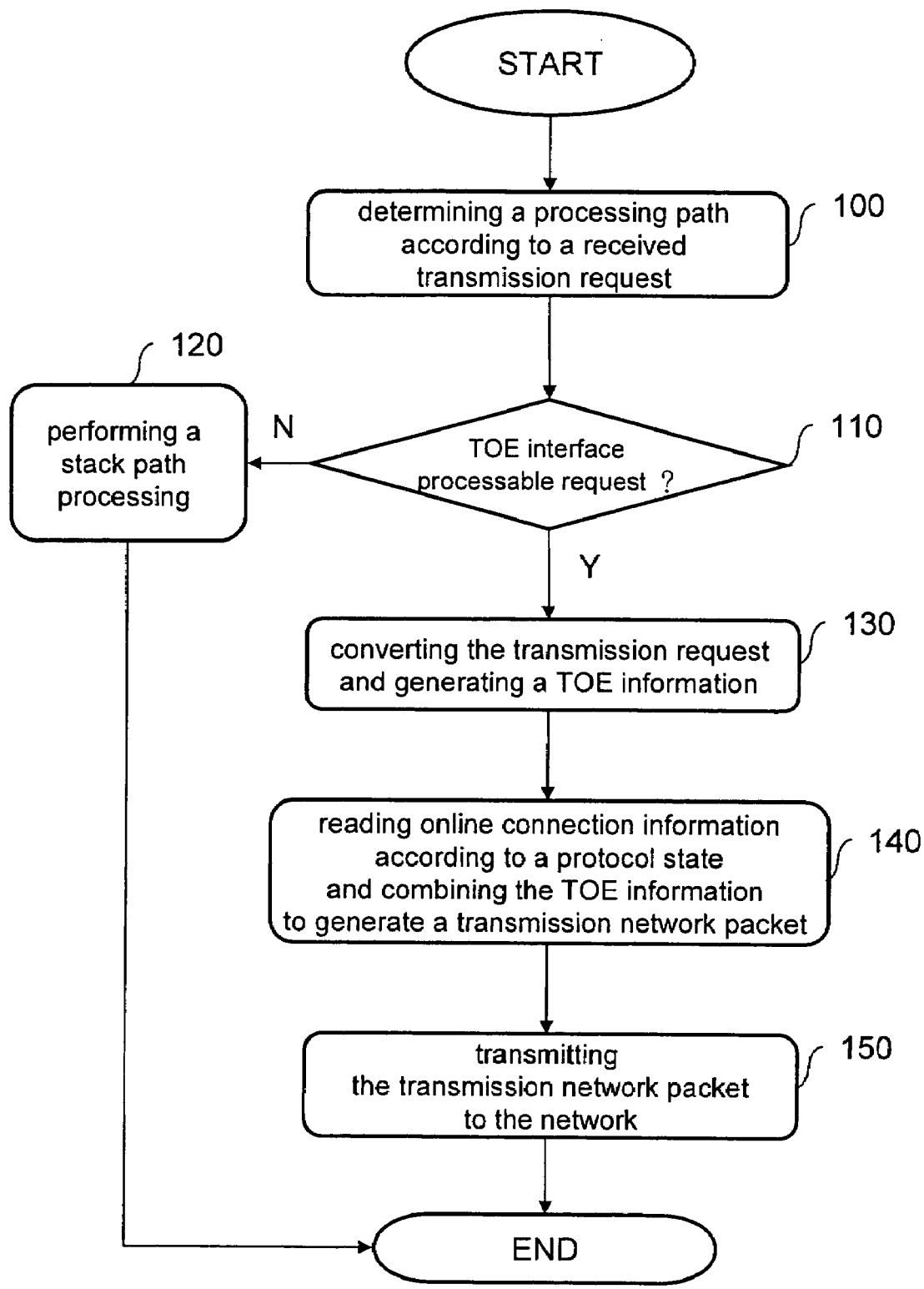
FIG. 4 is a flowchart of the disclosed transmission method.
Figure 5:
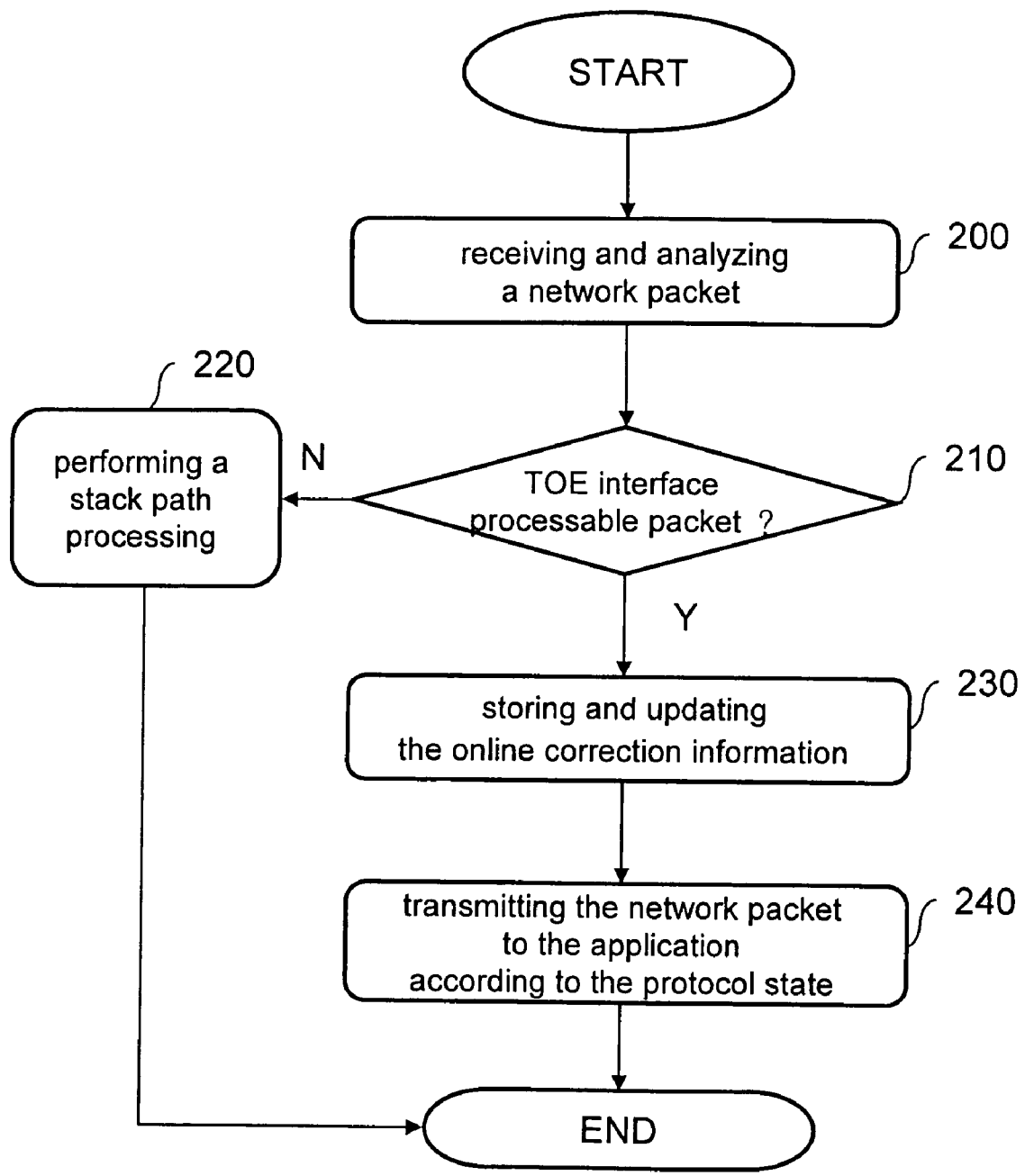
FIG. 5 is a flowchart of the disclosed reception method.

Finally, we use FIGS. 4 and 5 to explain the transmission and reception methods of the invention.

FIG. 4 shows the transmission procedure. First, after receiving a transmission request sent from an application 60 in the host 20, the socket API 51 sends it to the request dispatch shell 303 to determine its processing path (step 100). The request dispatch shell 303 determines whether it is a request that can be processed by the TOE interface (step 110). If not, the request is processed using the stack path processing method (step 120). Otherwise, once it is confirmed as a request processable by the TOE interface 30, the TOE path processing module 301 converts the transmission request and generates the corresponding traffic offload interface information (step 130). After the conversion, the TOE interface 30 reads the online connection information according to the protocol state of connection through the TCP/IP output module 31. Combined with the TOE interface information, the invention generates network packets that can be transmitted (step 140) and store them in the packet memory 34. Finally, the link layer module 37 sends the network packets to the network 10, the physical layer 40 (step 150). All the connection information during the transmission process is recorded in the flow scoreboard memory 33 and is updated continuously.

FIG. 5 shows the reception procedure. First, when a network packet is transmitted from the physical layer 40 into the link layer module 37, the TCP/IP input module 32 receives and analyzes it (step 200). The invention determines whether the received network packet can be processed by the TOE interface 30 (step 210). If not, the network packet is handled by the stack path processing module 53 for stack path processing (step 220). If it is TOE interface 30 processable, the analyzed packet data are stored in the packet memory 34 and the corresponding online connection information in the flow scoreboard memory 33 (step 230). Finally, transmits the network packet to the application 60 according to the protocol state (step 240). All the connection information during the reception process is recorded in the flow scoreboard memory 33 to maintain the consistency of the online connection information.

During the operation of the invention, to satisfy the gauges of network protocol, network packets are automatically generated at appropriate timing in the connection process to maintain the normal operations of network connection.

Certain variations would be apparent to those skilled in the art, which variations are considered within the spirit and scope of the claimed invention.

What is claimed is:

1. A hardware-based TCP/IP traffic offload engine (TOE) device between a host and a physical layer for processing traffic offload of network packets, the device comprising:
    a TOE interface, which is installed on a bus slot of the host for transmitting/receiving network packet data and including:
        an flow scoreboard memory, which records online connection information of transmitting/receiving network packets;
        a timer, which is connected to the flow scoreboard memory for processing the transmission/reception of network packets according to a protocol state;
        a TCP/IP output module, which generates a transmission network packet according to a transmission request from the host, updates the flow scoreboard memory at the same time, and sends the transmission network packet to the physical layer; and
        a TCP/IP input module, which analyzes and classifies a network packet received from the physical layer and updates the flow scoreboard memory at the same time, wherein
        the timer includes a processing procedure that periodically drives the TCP/IP output module to generate the transmission network packet, wherein the periodically processing procedure is accordance to a request of the TCP/IP input module; and
    a TOE driver, which executes under the operating system (OS) kernel of the host for controlling the TOE interface to process the transmission/reception of the network packet and including:
        a pointer buffer block, which records the states of a plurality of memory block pointers used by the TOE interface; and
        a TOE path processing module, which processes the transmission/reception of network packets according to the received transmission request by the TCP/IP input module, to determine if the transmission request is a TOE interface processable request that is without protocol stacking, converts the transmission request and generates a corresponding TOE interface information when receiving a transmission request from a utility of the host, reads online connection information according to a protocol state, combines the TOE information to generate the transmission network packet, and updates the pointer buffer block when receiving data transmitted from the TOE interface.

2. The device of claim 1, wherein the TOE interface contains a packet memory for temporarily holding the transmitted/received network packet data.

3. The device of claim 2, wherein the packet memory contains an arbitrator for determining the control privilege of the packet memory.

4. The device of claim 1, wherein the TOE interface contains a host interface for processing the transmission/reception and reading/writing of the network packets with the host.

5. The device of claim 4, wherein the host interface contains the procedure of executing the direct memory access (DMA) data transmissions and interrupts between the TOE interface and the host.

6. The device of claim 1, wherein the TOE interface contains a link layer module for processing the transmission/reception and reading/writing of the network packets between the packet memory and the physical layer.

7. The device of claim 1, wherein the TOE driver contains a request dispatch shell for dispatching the transmission request to an associated processing path.

8. The device of claim 1, wherein the TOE driver contains a command dispatch shell for processing the transmission/reception of the network packets using the TOE interface information.

9. The device of claim 1, wherein the TOE driver contains a memory management unit (MMU) for communicating with the pointer buffer block and the MMU of the OS and processing the mapping between virtual memory and physical memory.

10. The device of claim 1, wherein the TOE driver contains a stack path processing module to transmit/receive network packets by a stacking method.

* * * * *